United States Patent [19]

Umeda

[11] 4,325,451

[45] Apr. 20, 1982

[54] ELECTRIC POWER PLANT FOR VEHICLES

[75] Inventor: Haruhiko Umeda, Yokohama, Japan

[73] Assignee: Kabushiki Kaisha Komatsu Seisakusho, Tokyo, Japan

[21] Appl. No.: 183,764

[22] Filed: Sep. 3, 1980

Related U.S. Application Data

[63] Continuation of Ser. No. 35,982, May 4, 1979, abandoned, which is a continuation-in-part of Ser. No. 865,250, Dec. 28, 1977, abandoned.

[51] Int. Cl.³ .................... B60K 1/00; B60K 5/10
[52] U.S. Cl. ................... 180/294; 180/65 C; 180/298; 180/312
[58] Field of Search ............... 180/65 C, 65 F, 291, 180/292, 294, 298, 299, 312, 68.5, 89.13, 54 F; 248/639, 647, 681, 678

[56] References Cited

U.S. PATENT DOCUMENTS

| | | | |
|---|---|---|---|
| 1,199,708 | 9/1916 | Mueller | 180/294 |
| 1,527,431 | 2/1925 | Gumper | 180/65 C |
| 1,735,425 | 11/1929 | Froesch | 180/297 |
| 1,951,089 | 3/1934 | Fielder | 180/65 A |
| 2,623,602 | 12/1952 | Double | 180/294 |
| 3,451,571 | 6/1969 | Brisson | 180/298 |
| 3,497,090 | 2/1970 | Daniels | 180/68.5 |
| 3,720,446 | 3/1973 | Kelley | 180/291 |
| 3,866,781 | 2/1975 | Stedman et al. | 180/54 F |
| 4,231,708 | 11/1980 | Telesio | 180/298 |

*Primary Examiner*—David M. Mitchell
*Attorney, Agent, or Firm*—Armstrong, Nikaido, Marmelstein & Kubovcik

[57] ABSTRACT

In a wheeled vehicle such as a dump truck propelled by electric motors built into the respective wheels, a power plant is provided on a removable base for the generation of electric energy to be fed to the motors. The power plant comprises an electric generator and a pair of prime movers such as diesel engines on the opposite sides of the generator. This generator has its armature and magnetic field structure coupled directly to the respective prime movers thereby to be rotated in opposite directions relative to each other for increased power output.

4 Claims, 6 Drawing Figures

ELECTRIC POWER PLANT FOR VEHICLES

This is a continuation of application Ser. No. 35,982, filed May 4, 1979, which is a continuation-in-part application of Ser. No. 865,250, filed Dec. 28, 1977, both now abandoned.

BACKGROUND OF THE INVENTION

1. Field of the Invention

This invention relates to electric power plants, and in particular to such a power plant for propelling vehicles or the like. The electric power plant according to the invention is particularly well adapted for use in a vehicle of the type having electric drive motors built into both front and rear wheels.

2. Description of the Prior Art

A variety of proposals have been made for the electric power plant of motor-driven vehicles, among them being H. Umeda et al. Japanese utility Model Application No. 46-72705 filed on Aug. 16, 1971 by the assignee of the instant application. The power plant according to this Japanese utility model application comprises a pair of electric generators powered by respective internal combustion engines, each for feeding one of two pairs of electric drive motors on the front and rear wheels of a vehicle, in order that in the event of a failure of either engine-generator combination, the vehicle may be propelled by the other engine-generator combination.

One of the objections of this and other electric power plants of prior art design is that the power output of the generators is relatively low because they are each driven by only one engine or other prime mover. As a consequence, an inconveniently large sized generator or generators must be employed in order to obtain desired power output. The power plant proposed by the mentioned Japanese utility model application is also objectionable from the standpoint of installation space. The large space requirement made by this prior art power plant is due in part to the fact that each engine-generator combination extends longitudinally of the vehicle.

SUMMARY OF THE INVENTION

It is an object of this invention to derive the maximum possible power output from an electric generator of a given size used as a part of a power plant for electrically propelled vehicles or the like.

Another object of the invention is to economize the installation space for such an electric power plant on a vehicle or the like.

Still another object of the invention is to provide such an electric power plant which can be mounted on a desired vehicle or the like in a manner designed to highly facilitate the maintenance thereof.

These and other objects are met, in accordance with this invention, by the provision of an electric power plant including an electric generator having an armature and a field structure which are arranged for independent rotation with respect to each other. The armature and the field structure are connected to and rotated in opposite directions by respective prime movers, such for example as diesel engines, for converting the mechanical energy of the prime movers into electrical energy. It is thus possible to derive from a comparatively small sized generator sufficient electrical energy to propel, for example, a motor-driven vehicle such as a truck.

A further feature of this invention resides in a common base member on which the generator and the prime movers are mounted and which is intended to be removably installed on the vehicle so as to form the bottom of its power plant enclosure. In this manner, since the common base together with the electric power plant thereon can be readily removed without removal of the adjacent parts, the maintenance of the power plant is greatly facilitated.

In a preferred embodiment of the invention, the electric power plant on the common base is arranged transversely at the extreme front end of a motor-driven dump truck, wholly forwardly of its steerable front wheels. Thanks to this arrangement, the power plant requires a minimum installation space in the longitudinal direction of the vehicle, permitting effective use of the space in the longitudinal vehicle direction. Moreover, the steering angle of the front wheels can be increased to permit the vehicle to make sharp turns.

The above and other objects, features and advantages of this invention and the manner of attaining them will become more apparent, and the invention itself will best be understood, upon consideration of the following description of the preferred embodiment, with reference had to the accompanying drawings.

DESCRIPTION OF THE PREFERRED EMBODIMENT

Figure 1:
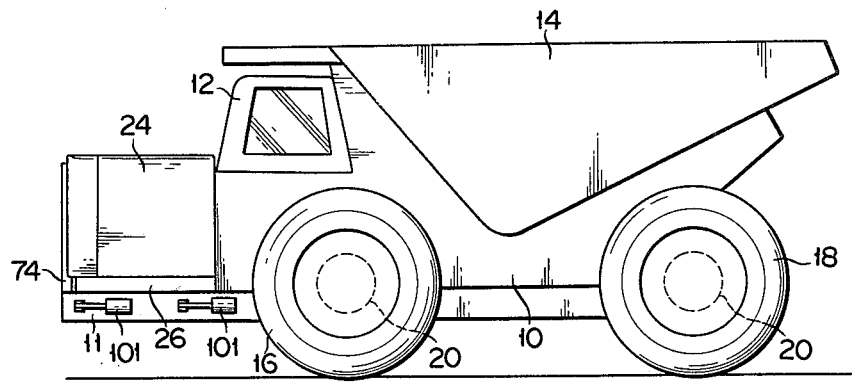
FIG. 1 is a schematic side elevational view of a dump truck driven by electric motors which can be fed from the electric power plant of the present invention.

The present invention will hereinafter be described in detail in association with a motor-driven dump truck of the two-axle, front wheel steer type illustrated in FIGS. 1 and 2. The dump truck broadly comprises a vehicle body 10 having a cab 12 mounted thereon adjacent its front end, an open cargo body 14 pivotally mounted on the main frame for carrying and dumping or spreading material, and front and rear pairs of dual wheels 16 and 18. The front wheels 16 can be steered by the usual steering mechanism, not shown, of the truck.

Figure 2:
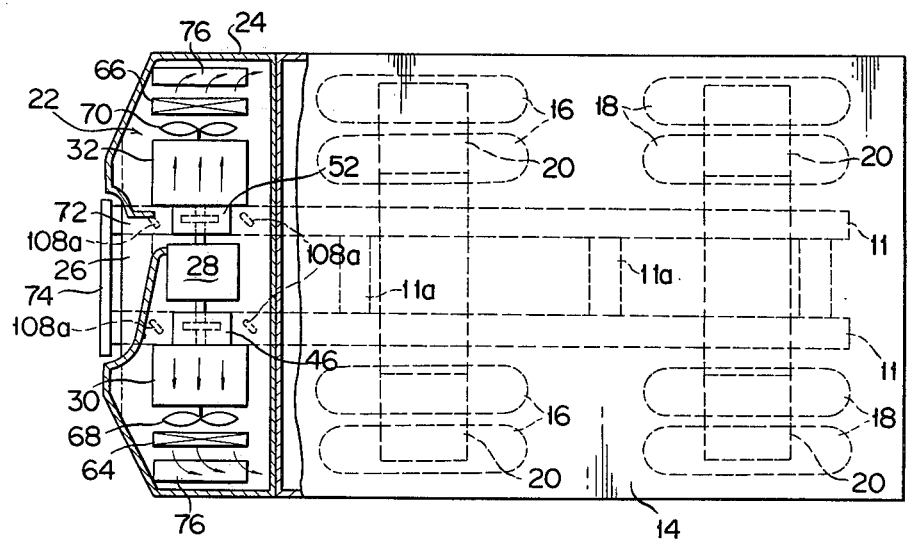
FIG. 2 is a schematic top plan view of the motor-driven dump truck of FIG. 1.

As clearly depicted in FIG. 2, all the dual wheels 16 and 18 of the dump truck are conventionally equipped with built-in electric motors 20 for propelling the vehicle. These drive motors are to be fed from an electric power plant, generally designated 22 in FIG. 2, that is mounted within an enclosure 24 disposed forwardly of the cab 12 and the steerable front wheels 16 and extending transversely of the vehicle.

Figure 3:
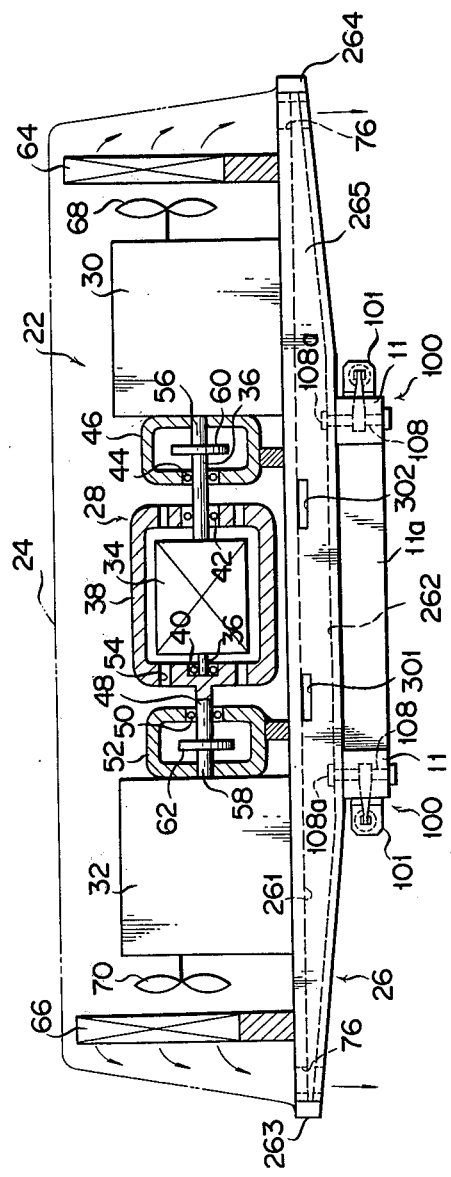
FIG. 3 is an enlarged, schematic front view, partly sectioned for clarity, of the electric power plant of FIG. 2.
Figure 4:
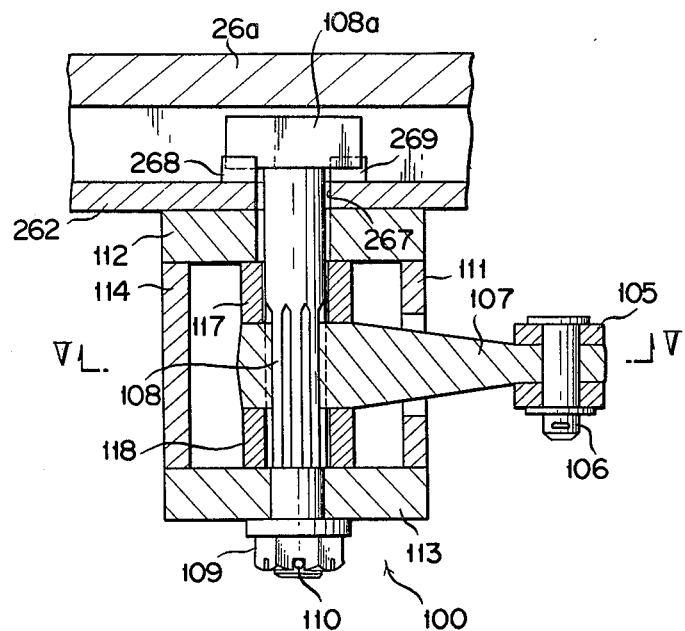
FIG. 4 is a fragmentary enlarged vertical sectional view of a locking device for locking the electric power plant in the vehicle body of the dump truck.

FIG. 3 illustrates in greater detail the configuration of the electric power plant 22. This power plant is mounted on a common, elongated base 26 detachably mounted on the dump truck so as to form a removable bottom of the power plant enclosure 24. The power plant 22 is broadly composed of an electric generator 28 disposed centrally over the removable base 26, and a pair of opposed prime movers 30 and 32 mounted on the removable base, each adjacent one end thereof, so as to be disposed on the opposite sides of the generator.

In practice, the generator 28 can take the form of either a DC or AC generator, and each of the prime movers 30 and 32 can take the form of, for example, a diesel engine or a gas turbine. The mechanical energy provided by such prime movers is to be converted, in the manner hereinafter set forth, into electrical energy by the generator 28 for feeding the drive motors 20. Both generator 28 and prime movers 30 and 32 are not illustrated in detail because of their common and well known nature.

The generator 28 comprises an armature 34 fixedly mounted on a rotatable shaft 36, and a field structure 38 enclosing the armature with an air gap therebetween. At its left hand end, as seen in FIG. 3, the armature shaft 36 is journalled in a bearing 40 supported by the field structure 38. The right hand end of the armature shaft 36 extends through another bearing 42 in the field structure 38 and is rotatably supported, via still another bearing 44, by a hollow support member 46 disposed between the generator 28 and the right hand prime mover 30 and fixedly mounted on the removable base 26. The armature 34 is thus mounted for rotation relative to the field structure 38.

The field structure 38 of the generator 28 is itself rotatably supported at its right hand end on the armature shaft 36 via the aforesaid bearing 42. At its left hand end the field structure 38 is integrally provided with a rotatable shaft 48 projecting outwardly therefrom and oriented in axial alignment with the armature shaft 36. This field structure shaft 48 is rotatably supported, via a further bearing 50, by another hollow support member 52 disposed between the generator 28 and the left hand prime mover 30 and fixedly mounted on the removable base 26.

It is now seen that the armature 34 and the field structure 38 of the generator 28 are mounted for independent rotation about the common axis with respect to each other. Seen at 54 in FIG. 3 are openings formed in both ends of the field structure 38 for ventilation purposes.

The pair of prime movers 30 and 32 are disposed with their output shafts 56 and 58 directed toward each other. These output shafts are also oriented substantially in axial alignment with the armature shaft 36 and the field structure shaft 48. The output shaft 56 of the right hand prime mover 30 is connected directly to the armature shaft 36 via a universal coupling 60 within the hollow support member 46. The output shafts 58 of the left hand prime mover 32 is likewise connected directly to the field structure shaft 48 via another universal coupling 62 within the hollow support member 52. The armature 34 and the field structure 38 are to be rotated in predetermined opposite directions by the respective prime movers 30 and 32.

As required, the prime movers 30 and 32 may be equipped with radiators 64 and 66 and fans 68 and 70, respectively, as parts of their cooling systems. FIG. 2 shows an air intake 72 which is formed in the front wall of the power plant enclosure 24 and which is covered with a grille 74. Admitted into the power plant enclosure 24 through the air intake 72, atmospheric air is utilized for cooling the generator 28 and the prime mover radiators 64 and 66 and is exhausted through outlets 76 formed in the removable base 26 adjacent both lateral ends thereof. If desired, suitable noise reduction means may be installed at the air intake 72 and air outlets 76.

Figure 6:
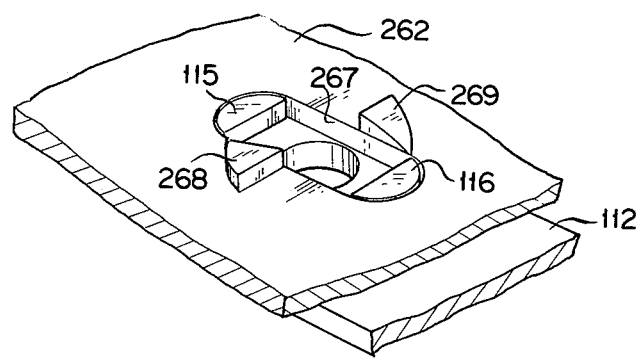
FIG. 6 is a fragmentary perspective view of a part of the locking device.
Figure 5:
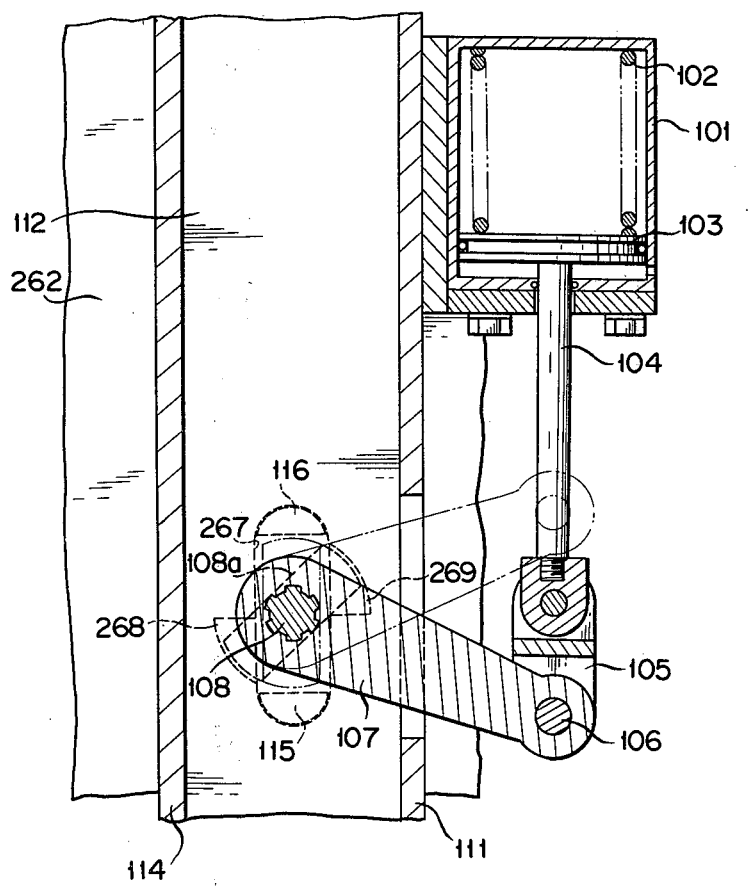
FIG. 5 is a cross sectional view taken along line V—V in FIG. 4.

In addition, with reference to FIGS. 3 and 6, the removable base 26 and a locking device 100 therefor are hereinafter described in detail.

The removable base 26 is formed in a box-like shape composed of an upper plate 261, lower plate 262, vertical side plates 263 and 264, vertical front plate 265 and vertical rear plate 266 within which a hollow space is formed. The removable base 26 is fixedly mounted through at least two or more locking devices 100, in the illustrated embodiment four locking devices are equipped as shown in FIG. 2, on a pair of box-like frame units 11 fixedly secured in an integral manner to the bottom of the vehicle body 10. The frame units 11 extend in parallel to each other along the longitudinal direction of the vehicle body 10 and are provided in place therebetween with a plurality of reinforcements 11a connected at substantially right angles to the frame units. Each of the locking devices 100 has a pneumatic or hydraulic cylinder 101 fixedly secured to a side plate member 111 of each frame unit 11. Within the cylinder 101, a compression spring 102 is disposed for always urging a piston 103 so as to thrust a piston rod 104 fixedly connected at one end thereof to the piston 103. The piston rod 104 is pivotally connected at the other end thereof to one end of a rockable lever 107 through a yoke 105 and a pivot pin 106. Reference numerals 117 and 118 represent collars which are mounted on the shaft 108 between each side of the rockable lever 107 and an upper and a lower plate members 112 and 113, respectively, in order to prevent the rockable lever 107 from a lateral shake thereof. Inserted in the manner of a spline through a boss formed at the other end of the rockable lever 107 a tightening shaft 108 which extends vertically from the lower plate member 113 of the frame unit 11 to an upper plate member 112 thereof, and furthermore extends through a substantially rectangle opening 267 formed in the lower plate 262 so as to thrust into the hollow space of the removable base 26. The thrusted upper end of the shaft 108 is formed as a similar shape to the opening 267 in cross section, but slightly smaller than the opening 267. On the other hand, the opposite end of the shaft 108 is formed in a smaller diameter part so as to be supported on the upper surface of the lower plate member 113. The opposite lower end of the shaft 108 extends through the lower plate member 113 and is threadedly connected to a nut 109 fixed through a cotter pin 110 to the shaft 108. In order to ensure the tightness of the shaft 108 between the removable base 26 and each of the frame units 11, a pair of wedge-shaped cam members 268 and 269 are fixedly secured to the upper surface of the lower plate 262 of the removable base 26 in the vicinity of each side end of the opening 267, respectively, in a symmetrical manner with each other with respect to the center of the opening 267. Further, at the locations on the upper surface of the upper plate member 112 of the frame unit 11 which respectively correspond to both longitudinal ends of the opening 267, a pair of positioning members 115 and 116 opposite to each other are fixedly secured thereto. Reference numerals 301 and 302 represents openings formed in the front plate member 265 of the removable base 26 in which forks of a forklift truck are inserted in case of removing the electric power plant 22 together with the removable base 26 from the vehicle body 10.

In operation, as the armature 34 and the field structure 38 of the generator 28 are rotated in the predetermined opposite directions by the respective prime movers 30 and 32, electrical energy is generated in accordance with the well known principle. Since the relative speed of rotation of each of the armature 34 and the field structure 38 with respect to the other is equal to the sum of the rotative speeds of the prime movers 30 and 32, the generator 28 can be reduced in size to provide desired power output.

The electrical energy thus generated is fed to the drive motors 20 through suitable control circuitry in order to cause rotation of the motors and hence to propel the dump truck. The electrical details are also not shown because of their conventional nature.

In case of removing the electric power plant 22 with the removable base 26 from the vehicle body 10 to ensure easy maintenance and inspection thereof, pneumatic or hydraulic fluid is firstly introduced from the source thereof into a chamber of the cylinder 101 air- or oil-tightly separated by the piston 103 from a spring chamber, so that the piston rod is retracted into the cylinder 101 by the sliding movement of the piston therein in the counter direction to the biassing direction of the spring 102, thereby rocking the lever 107. In response to the rocking motion of the lever 107, the shaft 108 is rotated so that the head 108a thereof sets free itself of the contact with the wedge-shaped cam members 268 and 269 and is aligned parallel to the opening 267 so that when the removable base is vertically lifted, the shaft head 108a can be passed through the opening 267. In this condition, forks of the forklift truck are inserted into the openings 301 and 302, respectively, formed in the front plate 215 of the removable base 26, and thus the electric power plant 22 together with the removable base 26 is removed from the vehicle body 10.

On the contrary, in case of mounting and tightening the electric power plant 22 with the removable base 26 on the frame units 11, the removable base 26 on which the electric power plant 22 is fixedly mounted is carried by a forklift truck over the front ends of the frame units 11 and is put down thereon in place so that each pair of positioning member 115 and 116 fit into both ends of each opening 267. Then, pneumatic or hydraulic fluid filled up in the cylinder 101 is discharged by the well known manner, so that the piston rod 104 is thrusted out from the cylinder 101 by the biassing force of the spring 102. As a result, the lever 107 is rocked with the result of rotation of the shaft 108 so that the head 108a of the shaft 108 comes again into contact with the pair of wedge shaped cam members 115 and 116, thereby accomplishing tight fixation between the removable base 22 and the frame units 11.

It will be observed from FIG. 2 that the electric power plant 22 on the removable base 26 is mounted transversely on the extreme front end of the dump truck, occupying a minimum space in the longitudinal direction of the vehicle. Furthermore, since the power plant 22 is disposed wholly forwardly of the steerable front wheels 16 of the dump truck, the steering angle of these front wheels can be increased to permit the vehicle to make turns with a small turning radius. The removable common base 26 of the power plant 22 is of course intended to afford easy maintenance thereof.

Having thus described the present invention, it is clear that the objects as stated above have been accomplished in a simple and readily practicable manner. It is to be understood, however, that the specific adaptation of the electric power plant disclosed herein is meant purely to illustrate or explain and not to impose limitations upon the invention, since numerous modifications and alterations will occur to the persons skilled in the art without departing from the scope of the invention as expressed in the following claims.

What I claim is:

1. In a wheel vehicle having front and rear wheels and a body mounted thereon, said vehicle being driven by electric motors and having a power plant enclosure mounted on a removable base, characterized in that said removable base is arranged wholly forwardly of the front wheels and transversely of the vehicle and is formed by a hollow shaped member comprising an upper plate, a lower plate, opposite vertical side plates supportingly connecting the upper and the lower plates, and vertical front and rear plates fixedly connecting the upper and the lower plates also, said removable base being mounted through at least two locking means on a pair of box-like frame units which are integrally secured to the bottom of a vehicle body and extend in parallel to each other along the longitudinal direction of the vehicle body, wherein each of the locking means comprises a pneumatic or hydraulic cylinder within which a piston is slidably accommodated, the cylinder being fixedly secured to a side plate member of each frame unit and the piston being always urged in one direction by a compression spring interposed between the piston and bottom of the cylinder, a piston rod fixedly connected at one end thereof to the piston on the opposite side of the compression spring, the other end of the piston rod extending through a pressure chamber of the cylinder and projecting out thereof, a rockable lever pivotally connected at one end thereof to the said other end of the piston rod and having a spline hole formed at a boss part of the other end of the rockable lever, a spline shaft vertically extending through the spline hole of the rockable lever from a lower plate member of the frame unit to which the lower end of the spline shaft is fixedly secured through a nut and projecting the upper end thereof through a substantially rectangular opening formed in the lower plate of the removable base, into a hollow space thereof, the projected upper end of the spline shaft having a head which is formed in a similar shape in cross section to the rectangular opening, but slightly smaller than the opening, wherein in order to lock the removable base on the frame units, the head of the spline shaft is engaged with an upper surface of the lower plate of the removable base when the spline shaft is rotated through the piston rod and the rockable lever by the resilient force of the compression spring, while in order to remove the removable base from the frame units the head is disengaged from the upper surface of the lower plate of the removable base when the spline shaft is rotated in the opposite direction by a pneumatic or hydraulic pressure counteracted to the resilient force of the compression spring.

2. The invention of claim 1, wherein the vertical front plate has openings into which forks of a forklift truck are inserted for removing the power plant enclosure from the vehicle body.

3. The invention of claim 1, wherein the head of the spline shaft is engaged with the upper surface of the lower plate of the removable base through a pair of wedge-shaped cam members which are fixedly secured to the upper surface of the lower plate of the removable base in the vicinity of each side end of the rectangular opening, respectively, in a symmetrical manner with each other with respect to the center of the opening.

4. The invention of claim 1, wherein each of the locking means further comprises a pair of positioning members fixedly provided at the locations on the upper surface of the upper plate member of the frame unit which respectively correspond to both longitudinal ends of the rectangular opening oppositely to each other.

* * * * *